(12) United States Patent
Rose et al.

(10) Patent No.: US 9,973,083 B1
(45) Date of Patent: May 15, 2018

(54) DC-DC CONVERTER CONTROLLER

(71) Applicant: NXP B.V., Eindhoven (NL)

(72) Inventors: Matthias Rose, Helmond (NL); Hendrik Johannes Bergveld, Eindhoven (NL); Olivier Trescases, Toronto (CA); David King Wai Li, Toronto (CA)

(73) Assignee: NXP B.V., Austin, TX (US)

( * ) Notice: Subject to any disclaimer, the term of this patent is extended or adjusted under 35 U.S.C. 154(b) by 0 days. days.

(21) Appl. No.: 15/724,867

(22) Filed: Oct. 4, 2017

(30) Foreign Application Priority Data

Nov. 15, 2016 (EP) .................................. 16198804

(51) Int. Cl.
| | |
|---|---|
| *G05F 1/00* | (2006.01) |
| *H02M 3/157* | (2006.01) |
| *H02M 1/08* | (2006.01) |
| *H02M 3/158* | (2006.01) |
| *H02M 1/00* | (2006.01) |

(52) U.S. Cl.
CPC .............. *H02M 3/157* (2013.01); *H02M 1/08* (2013.01); *H02M 3/158* (2013.01); *H02M 2001/0009* (2013.01)

(58) Field of Classification Search
CPC .. H02M 3/158; H02M 3/1588; H02M 3/1582; H02M 2001/0045; H02M 2001/0067
See application file for complete search history.

(56) References Cited

U.S. PATENT DOCUMENTS

| | | | |
|---|---|---|---|
| 5,218,705 A | 6/1993 | DeLuca et al. |
| 7,960,859 B2 | 6/2011 | Menas et al. |
| 8,054,058 B2 | 11/2011 | Liu et al. |
| 8,436,591 B2 | 5/2013 | Dearn |
| 8,816,757 B1 | 8/2014 | Yabbo et al. |
| 2007/0108953 A1 | 5/2007 | Latham |
| 2008/0136387 A1 | 6/2008 | Bertele |

(Continued)

OTHER PUBLICATIONS

Huang et al., "Single-Inductor Multi-Output (SIMO) DC-DC Converters With High Light-Load Efficiency and Minimized Cross-Regulation for Portable Devices," IEEE Journal of Solid-State Circuits, vol. 44, No. 4, Apr. 2009, 13 pages.

(Continued)

*Primary Examiner* — Adolf Berhane
*Assistant Examiner* — Afework Demisse

(57) ABSTRACT

A predictive controller for an inductive DC-DC converter comprising a switchable inductor is described. The predictive controller includes a DC-DC controller configured to generate a plurality of switching phases to control the inductor current in the switchable inductor, the duration of the switching phases being determined from at least one of a reference inductor current value and a reference output voltage value. The predictive controller includes a supervisory controller coupled to the DC-DC controller and configured to set a reference inductor current value dependent on an expected change in load current and/or voltage of a load configured to be connected to the load terminal. The expected change in load current and/or voltage is determined from a predetermined load profile.

15 Claims, 9 Drawing Sheets

(56) References Cited

U.S. PATENT DOCUMENTS

2008/0157745 A1 7/2008 Nakata
2013/0169172 A1* 7/2013 Kesterson .......... H05B 33/0815
                                                            315/186

OTHER PUBLICATIONS

Ma et al., "A Pseudo-CCM/DCM SIMO Switching Converter With Freewheel Switching," IEEE Journal of Solid-State Circuits, vol. 38, No. 6, Jun. 2003, 8 pages.

Feng et al., "High Performance Digital Control Algorithms for DC_DC Converts Based on the Principle of Capacitor Charge Balance," Power Electronics Specialist Conference, 2006. PESC '06. 37th IEEE. Jun. 18-22, 2006, 7 pages.

Foong et al., "Fast-Transient Integrated Digital DC-DC Converter With Predictive and Feedforward Control," IEEE Transactions on Circuits and Systems-I: Regular Papers, vol. 59, No. 7, Jul. 2012, 10 pages.

Meola, Andrew "The US government is pouring money into the Internet of Things," http://www.businessinsider.com/the-us-government-is-pouring-money-into-the-internet-of-things-2016-5, Business Insider, May 31, 2016, 4 pages.

Torchia et al., "Internet of Things Spending Forecast to Reach Nearly $1.3 Trillion in 2019 Led by Widespread Initiatives and Outlays Across Asia/Pacific," http://www.businesswire.com/news/home/20151210005089/en/internet-Things-Spending-Forecast-Reach-1.3-Trillion, BusinessWire, Dec. 10, 2015, 3 pages.

Lee, Timothy, "The Hardware Enablers for the Internet of Things— Part I," https://iot.ieee.org/newsletter/january-2015/the-hardware-enablers-for-the-internet-of-things-part-i.html, IEEE Internet of Things, Jan. 13, 2015, 5 pages.

Li, et al., "Small-Resistance and High-Quality-Factor Magnetic Integrated inductors on PCB," IEEE Transactions on Advanced Packaging, vol. 32, Issue 4, Nov. 2009, 17 pages.

Ludwig et al., "PCB integrated inductors for Low Power DC/DC Converter," IEEE Transactions on Power Electronics, vol. 18, No. 4, Jul. 2003, 9 pages.

Li et al., "Design and Performance Evaluation of Microprocessor Packaging Capacitors Using Integrated Capacitor-Via-Plane Model," IEEE Transactions on Advanced Packaging, vol. 23, No. 3, Aug. 2000, 7 pages.

Stamatakis et al., "Periodic collection of spectrum occupancy data by energy constrained cognitive IoT devices," Wireless Communications and Mobile Computing Conference (IWCMC), 2015 International, Aug. 24-28, 2015.

Ashraf et al., "Energy monitoring prototype for Internet of Things: Preliminary results," Internet of Things (WF-IoT), 2015 IEEE 2nd World Forum on, Issue Date: Dec. 14-16, 2015,10 pages.

Healy et al., "Wireless sensor node hardware: A review," IEEE Sensors 2008 Conference, 4 pages.

Raghunathan et al., "Energy-aware wireless microsensor networks," IEEE Signal Processing Magazine, Mar. 2002, 11 pages.

Enz et al., "Wisenet: an ultralow-power wireless sensor network solution," Computer, Published by the IEEE Computer Society, vol. 27, No. 8, Aug. 2004, 9 pages.

Cheng et al., "Minimum Time Control for Multiphase Buck Converter: Analysis and Application," IEEE Transactions on Power Electronics, vol. 29, No. 2, Feb. 2014, 10 pages.

Pitel et al., "Minimum-Time Transient Recovery for DC-DC Converters Using Raster Control Surfaces," IEEE Transactions on Power Electronics, vol. 24, No. 12, Dec. 2009, 12 pages.

Radic et al., "Minimum Deviation Digital Controller IC for Single and Two Phase DC-DC Switch-Mode Power Supplies," IEEE Transactions on Power Electronics, vol. 28, No. 9, Sep. 2013.

Dhople et al., "Time-Optimal Control in Dc-Dc Converters: A Maximum Principle Perspective," 2014 IEEE Applied Power Electronics Conference and Exposition—APEC 2014, 5 pages.

Sahu et al., "A Low Voltage, Dynamic, Noninverting, Synchronous Buck-Boost Converter for Portable Applications," IEEE Transactions on Power Electronics, vol. 19, No. 2, Mar. 2004, 10 pages.

Redl et al., "Near-Optimum Dynamic Regulation of DC-DC Converters Using Feed-Forward of Output Current and Input Voltage with Current-Mode Control," IEEE Transactions on Power Electronics, vol. PE-1, No. 3, Jul. 1986, 12 pages.

Bryant et al., "Voltage Loop of Boost PWM DC-DC Converters With Peak Current-Mode Control," IEEE Transactions on Circuits and Systems—I: Regular Papers, vol. 53, No. 1, Jan. 2006, 7 pages.

* cited by examiner

650

660

670

680

700

720

DC-DC CONVERTER CONTROLLER

CROSS-REFERENCE TO RELATED APPLICATIONS

This application claims priority under 35 U.S.C. § 119 to European patent application no. EP16198804.3, filed Nov. 15, 2016, the contents of which are incorporated by reference herein.

This disclosure relates to a predictive controller for inductive DC-DC converters.

Switched-mode power supplies may be implemented as an inductive DC-DC converter to either increase or decrease a supply voltage and/or current depending on the requirements of a connected load. The controllers for DC-DC converters in a continuous-conduction mode typically generate two phases during each switching period of the DC-DC converter which control various switches implemented as MOS transistors which include a body diode. The particular switches controlled during each phase may depend on the type of DC-DC converter i.e. buck converter, boost converter or buck-boost converter. In some applications the load demand may change significantly up or down, for example during a change between a stand-by mode and a normal operation mode. When changing between low load and high load conditions, the DC-DC converter may undershoot and/or overshoot the required supply voltage potentially resulting in damage to a connected device which may be implemented in advanced CMOS technology. This overshoot may typically be minimized by time-optimized control (TOC) methods and/or by increasing the size of the output capacitance of the DC-DC Converter. For a buck converter the minimum response time, $t_{res}$, for an input voltage $V_{in}$, output voltage $V_{out}$ and inductance value L may be $$t_{res} = \frac{\Delta I_{out} L}{V_{in} - V_{out}}\left(1 + \sqrt{1 + \frac{V_{in} - V_{out}}{V_{out}}}\right) \quad (1)$$

Equation (1) is only valid for large load current steps, $I_{out}$, relative to the inductor current ripple, $I_L$. From equation (1), $t_{res}$ is directly proportional to $I_{out}$ and L, which results in a physical limitation imposed by the inductive energy transfer, irrespective of the controller architecture, or the switching frequency. The best-case output droop voltage, $V_{res}$, assuming negligible effective series resistance, is given by:

$$\Delta V_{res} = \frac{Q_1}{C_{out}} = \frac{\Delta I_{out}^2}{2 C_{out} m_1} = \frac{\Delta I_{out}^2}{2 C_{out}(V_{in} - V_{out})} \quad (2)$$

For TOC control schemes, a minimum capacitance value for $C_{out}$ is required to achieve a given voltage deviation, $V_{res}$.

Various aspects of the disclosure are defined in the accompanying claims. In a first aspect there is defined a predictive controller for an inductive DC-DC converter comprising a switchable inductor arranged to be switchably coupled to at least one of a voltage supply input terminal and a load terminal during a switching phase of a switching period, the predictive controller comprising: a DC-DC controller configured to generate a plurality of switching phases to control the inductor current in the switchable inductor, the duration of the switching phases being determined from at least one of a reference inductor current value and a reference output voltage value, and a supervisory controller coupled to the DC-DC controller and configured to set a reference inductor current value dependent on an expected change in load current and/or voltage of a load configured to be connected to the load terminal, wherein the expected change in load current and/or load voltage is determined from a predetermined load profile.

In embodiments, the predictive controller may be further configured to increase the inductor current reference value before an increase in load current.

In embodiments the supervisory controller may be configured to generate a sequence of increasing reference inductor peak current values before an increase in load current.

In embodiments, the predictive controller may be further arranged to short-circuit the inductance of the DC-DC controller during at least one switching phase.

In embodiments, the predictive controller may be further configured to decrease the inductor current at a rate determined from the predetermined load profile in response to a decrease in load current and/or load voltage.

In embodiments, the supervisory controller may be further configured to monitor the load current and to update the predetermined load profile in response to the monitored load current.

In embodiments, the supervisory controller may be further configured to detect a transient in the load current and/or load voltage and to store the transient time and load current and/or load voltage value.

In embodiments, the predetermined load profile may be determined dependent on the duration of time that the inductance is connected to the load terminal during a switching period.

In embodiments, the default predetermined load profile may comprise a maximum load current value.

In embodiments, the DC-DC controller may be configured to generate at least three switching phases.

In embodiments, the DC-DC controller may comprise a hysteretic current loop and hysteretic voltage loop, wherein the hysteretic current loop is configured to generate a first switching phase and a second switching phase from a comparison of the inductor current and a reference current generated from an expected load current and the hysteretic voltage loop is configured to generate a third switching phase and a fourth switching phase from a comparison between the output voltage and a predetermined output voltage.

Embodiments of the predictive controller may be included in an inductive DC-DC converter which may comprise a capacitance coupled between an output voltage terminal and a ground terminal, wherein the inductive DC-DC converter is configured to increase the inductor current before an increase in load voltage and/or load current.

In embodiments, the DC-DC converter may comprise a switchable inductor, the switchable inductor comprising a first series arrangement of a first transistor and a second transistor between the voltage supply input terminal and the ground terminal, a second series arrangement of a third transistor and a fourth transistor between the load terminal and the ground terminal; and an inductance arranged between a common node of the first series arrangement and a common node of the second series arrangement, and wherein the DC-DC controller is coupled to the control terminals of the transistors. The second transistor and the fourth transistor may both be on during at least one switching phase.

In one or more embodiments, the first transistor and the fourth transistor is on during a first switching phase, the second transistor and the third transistor are on during a second switching phase, and the second transistor and the fourth transistor are on during a third switching phase, wherein the inductance is shorted during the third switching phase.

In one or more embodiments, the first transistor is on during a first switching phase, the second transistor is on during a second switching phase, the third transistor is on during a third switching phase and the fourth transistor is on during a fourth switching phase, wherein the inductance is shorted during overlaps between the second switching phase and the fourth switching phase.

In one or more embodiments of the DC-DC converter, during an increase in load voltage and/or current the duration of the first switching phase is adjusted to reach a reference peak inductor current in each switching-period.

In embodiments, the DC-DC converter may comprise a switchable inductor, the switchable inductor comprising a series arrangement of a first transistor and a second transistor between a voltage supply input terminal and a ground terminal, an inductance arranged between a common node of the first series arrangement and a voltage output terminal and a third transistor arranged in parallel with the inductance, and wherein the DC-DC controller is coupled to the control terminals of the transistors and in operation the first transistor is on during a first switching phase, the second transistor is on during a second switching phase, the third transistor is on during a third switching phase wherein the inductance is shorted during the third switching phase.

In embodiments, the DC-DC converter may comprise a switchable inductor, the switchable inductor a series arrangement of a first transistor and a second transistor between a voltage output terminal and a ground terminal, an inductance arranged between a common node of the series arrangement and a supply voltage input, and a third transistor arranged in parallel with the inductance, and wherein the DC-DC controller is coupled to the control terminals of the transistors and in operation the first transistor is on during a first switching phase, the second transistor is on during a second switching phase, the third transistor is on during a third switching phase wherein the inductance is shorted during the third switching phase.

In the figures and description like reference numerals refer to like features. Embodiments are now described in detail, by way of example only, illustrated by the accompanying drawings in which:

FIG. 11c shows the measured response of the inductive buck-boost DC-DC converter of FIG. 10a to a high-to-low load current step using the predictive controller as outlined in FIG. 10a.

FIG. 11d shows the measured response of the inductive buck-boost DC-DC converter of FIG. 10a to a low-to-high load current step using the predictive controller as outlined in FIG. 10a.

FIG. 12b shows the load profile response of the wireless sensor of FIG. 12a.

Figure 1:
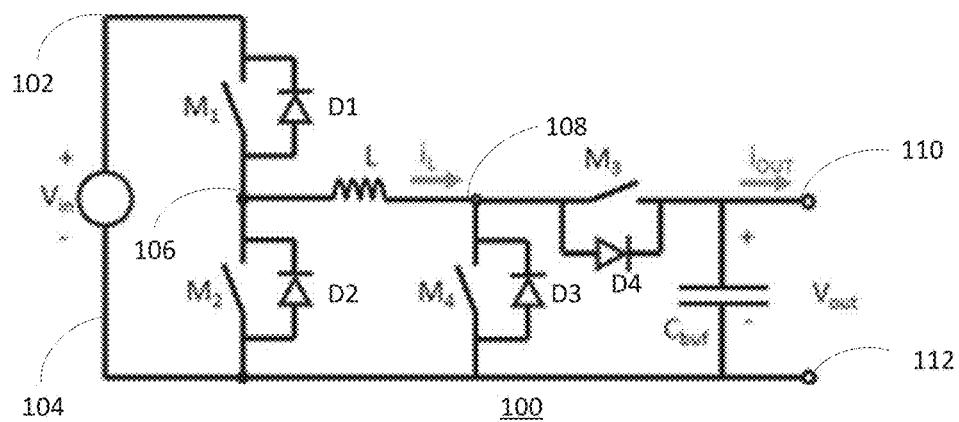
FIG. 1 shows a typical circuit of a non-inverting inductive DC-DC buck-boost converter circuit.

FIG. 1 shows a typical non-inverting inductive DC-DC buck-boost converter circuit 100 which is typically coupled to a controller (not shown). The DC-DC converter 100 comprises four switches M1 to M4 which are typically implemented as a MOS transistor with a respective body diode D1 to D4, and an inductor L. A series arrangement of switches M1 and M2 is connected between a DC supply terminal 102 and a second supply rail 104 which may typically be a ground. A series arrangement of switches M3 and M4 is connected between a first output terminal 110 and a second output terminal 112 which is connected to the second supply rail 104. The inductor L is connected between the common node 106 between switches M1 and M2 and the common node 108 between switches M3 and M4. A capacitor $C_{buf}$ is connected between the first output terminal 110 and the second output terminal 112.

The buck-boost converter 100 may convert a DC input voltage across supply input terminals 102, 104 into a DC output voltage across terminal 110,112 which is either higher or lower than the input voltage. The buck-boost converter may be used in IoT (Internet-of-Things) applications, where the input voltage may come from many different sources spanning a large voltage range and where the supply voltage needed by the system is either above or below the input voltage.

In order to achieve high efficiency, the DC-DC converter 100 typically operates in three different modes i.e. either buck mode, buck-boost mode or boost mode depending on the input-to-output voltage ratio $M=V_{out}/V_{in}$. The three modes of operation are described in Table 1 for the continuous conduction mode (CCM).

TABLE 1

| Mode of operation | M1 | M2 | M3 | M4 | Voltage conversion ratio |
|---|---|---|---|---|---|
| buck mode | $\phi_1$ | $\phi_2$ | on | off | $M(D) = D$ |
| buck-boost mode | $\phi_1$ | $\phi_2$ | $\phi_2$ | $\phi_1$ | $M(D) = \dfrac{D}{1-D}$ |
| boost mode | on | off | $\phi_2$ | $\phi_1$ | $M(D) = \dfrac{1}{1-D}$ |

The voltage conversion ratio M is controlled by the duty cycle D. In continuous conduction mode using a pulse-width modulation (PWM) control method, one switching period $T_s$ is split into two non-overlapping phases generated by the controller (not shown) which has control outputs connected to the control inputs of each of the switches M1 to M4 and may monitor the inductor current and load current via current sensors (not shown). For MOS transistors, the controller outputs are typically connected to the gate of the MOS transistor. With reference to table 1, depending on the mode of operation some of the switches M1 to M4 are permanently turned on (on) or off (off) or are turned on only during phase 1 ($\phi_1$) or during phase 2 ($\phi_2$) of a switching period. The switching frequency of the DC-DC converter 100 is given by $f_s=1/T_s$. The duty cycle of the DC-DC converter 100 D is determined from the ratio of first switching phase $\phi_1$ and the total switching period $T_s$, i.e. $D=\phi 1/T_s$.

Figure 2:
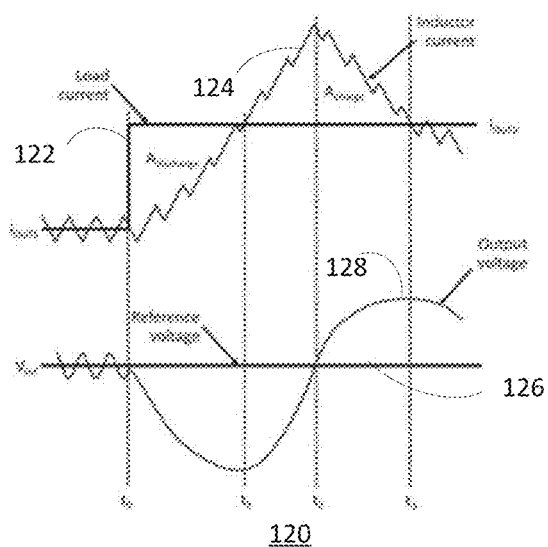
FIG. 2 illustrates a typical load step response of the DC-DC converter of FIG. 1 when controlled by a conventional pulse-width modulated (PWM) voltage-mode controller.

A typical load step response 120 of the DC-DC converter 100 controlled by a conventional pulse-width modulated (PWM) voltage-mode controller in CCM is shown in FIG. 2. Line 122 shows the variation of load current of a load (not shown) connected to the output terminals 110,112. When a load step from a first lower current $i_{OUT1}$ to a second higher current $i_{OUT2}$ occurs at time $t_0$, the voltage control loop of the DC-DC converter 100 reacts to the drop of the output voltage 128 that occurs due to discharge of buffer capacitor $C_{buf}$. The converter output current $i_{OUT2}$ is higher than the inductor current $i_L$ shown by line 124 during this period ($t_0 \le t \le t_1$). This can potentially cause a malfunction of the connected load due to the supply voltage drop. In the following period ($t_1 \le t \le t_3$) the control loop increases the inductor current $i_L$ further above $i_{OUT2}$ to recharge the output capacitor $C_{buf}$. The inductor current is only ramped down when the output voltage crosses the reference voltage illustrated by line 126 at time $t_2$. This delay in ramp down causes a significant voltage overshoot at the output of the converter 100 compared with the reference voltage $V_{ref}$. Such a voltage overshoot may lead to damage of the connected load, particularly in advanced CMOS technologies.

Figure 3:
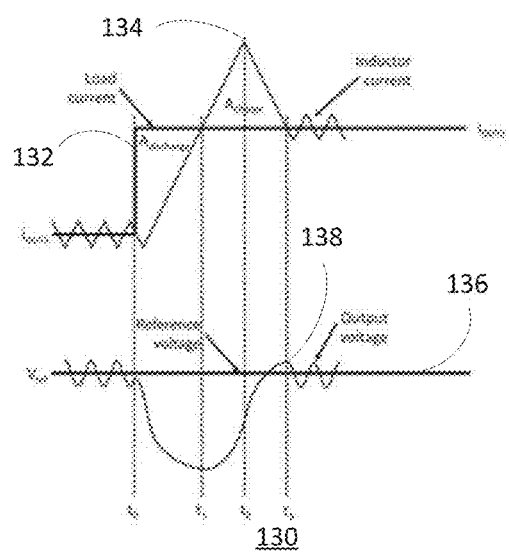
FIG. 3 shows a load step response of the DC-DC converter of FIG. 1 when controlled by a known controller having an improved capacitor charge-balance-controller.

FIG. 3 shows a load step response 130 of the DC-DC converter 100 using a known controller having an improved capacitor-charge-balance controller. The load step response 130 shows the load current 132, the inductor current 134, the reference voltage 136 and the output voltage 138. In this control scheme, when the load step from $I_{out1}$ to $I_{out2}$ occurs at time $t_0$, the inductor current 134 is continuously ramped up in response to the load step since the output voltage drops below the reference voltage. This may be achieved by interrupting the pulse-width modulated voltage mode controller and continuously operating the DC-DC converter in switching phase 1 (M1 and M3 on, corresponding to a buck mode of operation). At time $t_2$, the inductor current is ramped down continuously until the inductor current matches the new load current $I_{out2}$. This is achieved by continuously operating the DC-DC converter in switching phase 2 (M2 and M3 on, buck mode). Time $t_2$ is determined as the point at which the ramp down commences such there is exact charge balance i.e. $A_{discharge}=A_{charge}$ where $A_{discharge}$ is the area bounded by the load current line 132 and the inductor current line 134 between times $t_0$ and $t_1$ and $A_{charge}$ is the area bounded by the load current line 132 and the inductor current line 134 between times $t_1$ and $t_3$. The reversal in inductor current now happens before the output voltage crosses the reference voltage. This can lead to less voltage over-and undershoot than for the controller with load step response 120 but there is still significant over-and undershoot because of the limitation in the accuracy of the charge balancing due for example to variations in inductance value, and also because the controller can only respond once the load step has occurred. The amount of overshoot may be mitigated by increasing the size of the buffer capacitor $C_{buf}$. After time $t_3$, the pulse-width modulated voltage mode controller may be activated again.

Figure 4:
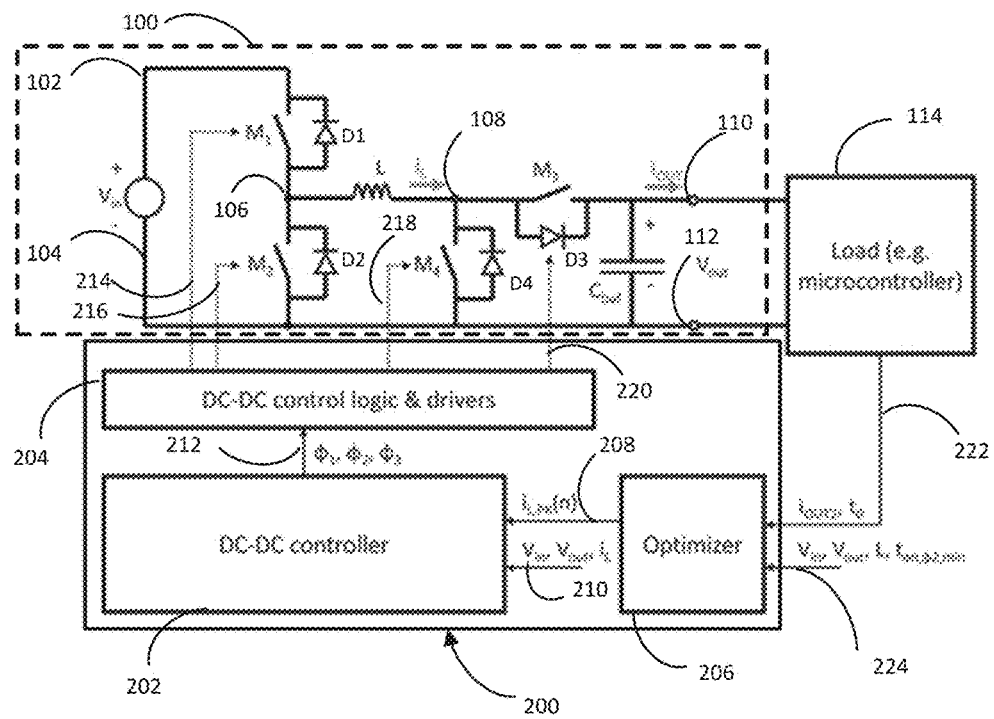
FIG. 4 shows a predictive controller for an inductive buck-boost DC-DC converter according to an embodiment.

FIG. 4 shows a predictive controller 200 for an inductive DC-DC converter according to an embodiment. The predictive controller 200 includes a DC-DC controller 202 for generating switching phases, DC-DC control logic and drivers 204 and an optimizer 206 which may also be referred to as a supervisory controller. The optimizer 206 may have a load parameter input 222 and a control parameter input 224. The optimizer 206 may have an inductor current target or inductor current reference output 208 connected to the DC-DC controller 202. The DC-DC controller 202 may have a DC-DC control parameter input 210. The DC-DC controller 202 may have a switching phase output 212 connected to the DC-DC control logic and drivers 204. It will be appreciated that the switching phase output 212 may include multiple wires. The DC-DC control logic and drivers 204 may have driver outputs 214, 216, 218, 220 for controlling a respective switch of a DC-DC converter.

In operation, the predictive controller 200 may be connected to a buck-boost converter switch circuit 100. A first driver output 214 may be connected to control input of switch M1. A second driver output 216 may be connected to control input of switch M2. A third driver output 220 may be connected to control input of switch M3. A fourth driver output 218 may be connected to control input of switch M4. Switches M1 to M4 may be implemented as MOS transistors and the control inputs may be the gate terminals of the respective transistors.

A load 114 which may for example be a microcontroller (MCU) may be connected to the output terminals 110,112 of the DC-DC buck-boost converter 100 and may also have a load parameter output connected to the load parameter input 222 of the optimizer 206. An inductor current sensor (not shown) may be connected to the parameter input 210 of the DC-DC controller 202. An input voltage detector (not shown) may be connected to the parameter input 210 of the DC-DC controller 202. An output voltage detector (not shown) may be connected to the parameter input 210 of the DC-DC controller 202. An input voltage detector (not shown) may be connected to the parameter input 224 of the optimizer 206. An output voltage detector (not shown) may be connected to the parameter input 224 of the optimizer 206. The optimizer 206 may also receive a predetermined value of the inductance L and the minimum on time of the second switching phase ($t_{on,\phi 2,min}$) on the parameter input 224. In operation the DC-DC controller 202 may generate three non-overlapping switching phases, the control of the buck-boost circuit is indicated by table 2.

TABLE 2

| Mode of operation | M1 | M2 | M3 | M4 | Voltage conversion ratio |
|---|---|---|---|---|---|
| buck mode | φ₁ | φ₂, φ₃ | on | φ₃ | $M(D) = D$ |
| buck-boost mode | φ₁ | φ₂, φ₃ | φ₂ | φ₁, φ₃ | $M(D) = \dfrac{D}{1-D}$ |
| boost mode | on | φ₃ | φ₂ | φ₁, φ₃ | $M(D) = \dfrac{1}{1-D}$ |

The difference between table 2 and table 1 is the additional phase $\phi_3$ used to control switches M2 and M4. This additional switching phase $\phi_3$ may be used in case the inductor current deviates significantly from the output current of the DC-DC converter. The additional switching phase $\phi_3$ can be introduced to all three modes of operation of the converter as shown in Table 2. During phase $\phi_3$ the transistors M2 and M4 are turned on and the inductor is shorted. In this case the inductor current is free-wheeling and no energy is drawn from the input or delivered to the output. The duty cycle D is determined as for table 1.

As shown in FIG. 4, the load 114 includes a microcontroller which may include a predetermined load profile in memory (not shown). Alternatively, the microcontroller may generate a load profile and store it in memory (not shown) and subsequently provide the load profile information to the optimizer 206. In other examples the optimizer 206 may include a predetermined load profile of the load 114. If a predetermined load profile is not available the optimizer 206 may generate a load profile of the load 114 by measuring the change in the output load current over time.

This predetermined load profile may then be used to trigger the optimizer 206 to vary the required reference inductor current value output on the target inductor current output 208. The DC-DC controller 202 may alter the duration of $\phi_1$, $\phi_2$, and $\phi_3$ depending on whether the required reference current value is increasing or decreasing. If an increased inductor current $I_L$ is required, corresponding to an increase in the reference inductor current value then the duration of φ1 may increase. If a decreased inductor current $I_L$ is required then the duration of $\phi_2$ may increase. During phase $\phi_3$, the inductor current level remains substantially constant, so phase φ3 may be used in conjunction with phases $\phi_1$ and $\phi_2$ to control the rate of inductor current increase or decrease. Phase φ3 may be used in conjunction with phases $\phi_1$ and $\phi_2$ to maintain the inductor current $I_L$ at the inductor current reference value. In some systems for example IoT wireless systems, the load current variation may be predictable and repetitive. By using a predetermined profile of the load current over time, the optimizer 206 may be able to predict when an expected load current variation or load step will occur and to use this prediction to increase or decrease the inductor current $I_L$ to minimize overshoot and undershoot.

Figure 5:
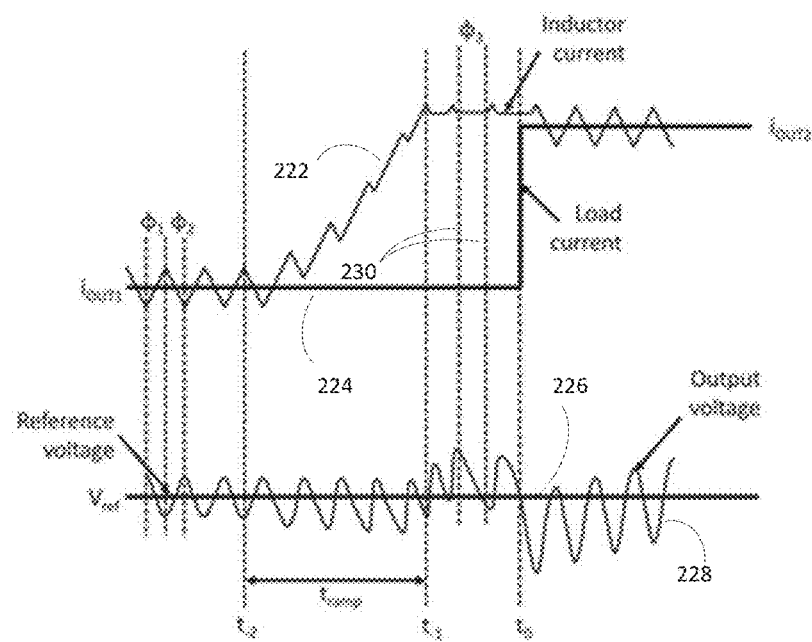
FIG. 5 shows an example response using the predictive controller of FIG. 4 when a load step from a first load current to a second higher load current occurs

FIG. 5 shows an example response 220 using the predictive controller 200 over time when a load step from a first load current $I_{out1}$ to a second higher load current $I_{out2}$ occurs. The response 220 shows the load current line 224, the inductor current 222, the reference voltage 226 corresponding to the desired DC output voltage and the actual output voltage 228 ($V_{out}$).

The inductor current 222 may increase during switching phase $\phi_1$, decrease during switching phase $\phi_2$, and remain constant during switching phase $\phi_3$ Based on a predicted load step to a higher current $I_{OUT2}$ at time $t_0$, the optimizer 206 may calculate an optimum ramp time $t_{ramp}$ based on $V_{in}$, $V_{out}$, L and $t_{on,\phi2,min}$ and translate this into a sequence of increasing target or reference inductor peak current values $i_{L,PK}(n)$ where n is the number of the consecutive switching period. These target inductor peak currents may be sent to the DC-DC controller 202 starting at time $t_{-2}$ before the actual load step occurs.

The DC-DC controller 202 may translate the parameters received from the optimizer into the consecutive switching phases $\phi_1$, $\phi_2$ and $\phi_3$.

The DC-DC controller 202 may ramp the inductor current 222 to a new target value at $t_{-1}$ by increasing the on-time of $\phi_1$ and decreasing the on-time of $\phi_2$ during each switching period. The new target value may be an inductor current slightly above the predicted output load $I_{out2}$.

The DC-DC controller 202 may operate in peak current mode control to adjust switching phase $\phi_1$ such that the inductor reference value or target peak inductor current $i_{L,PK}(n)$ is reached in each switching period n. The switching phase $\phi_2$ may be adjusted such that the output voltage is maintained during the inductor current ramp period $t_{ramp}$.

During the ramp, switching phase $\phi_3$ may be either zero, in case of a variable switching frequency control, or eventually non-zero, in case of fixed-switching-frequency control.

The switching phase information $\phi_1$, $\phi_2$ and $\phi_3$ is provided by the DC-DC controller to the control logic and gate drivers which turn-on and turn-off the switches $M_1$ to $M_4$ accordingly.

At time $t_{-1}$ once the new target value has been reached, the inductor current may be maintained substantially constant using switching phases $\phi_1$, $\phi_2$ and $\phi_3$ The on-time of switching phase $\phi_3$ shown for example between timelines 230 is much larger than $\phi_1$, $\phi_2$ to keep the value of $I_L$ constant. When the load step eventually occurs at time $t_0$, the predictive controller 200 then maintains the average inductor current value in line with the new load current $I_{out2}$ using switching phases $\phi_1$, $\phi_2$.

By ramping the inductor current prior to the load step, the output voltage overshoot 228 may be reduced.

The predicted load current for which the inductor current gets adjusted before the load step may not have to exactly match the actual load current after the load step $i_{OUT2}$ to achieve a reduced voltage overshoot and/or undershoot compared to the state-of-the-art control schemes.

The time at which the inductor current needs to be increased may depend on (1) on the magnitude of the applied step, (2) the applied switching period (i.e. $\phi_1+\phi_2$) and (3) the minimum duration of $\phi_2$. The latter is needed since $\phi_2$ needs to become shorter and shorter during the applied inductor current ramp to accommodate the still-low load current $i_{OUT1}$. Due to finite switch-on and switch-off times of power switches, the duration of $\phi_2$ cannot become infinitely small and is limited to the minimum on-time $t_{on,\phi2,min}$. By determining the time instant $t_0$ at which the load step will occur, as well as knowing $i_{OUT1}$, $i_{OUT2}$, $V_{in}$, $V_{out}$ and L, the optimum duration of the ramp up $t_{ramp}=t_{-1}-t_{-2}$ and the starting time $t_{-2}$ may be determined.

Figure 6:
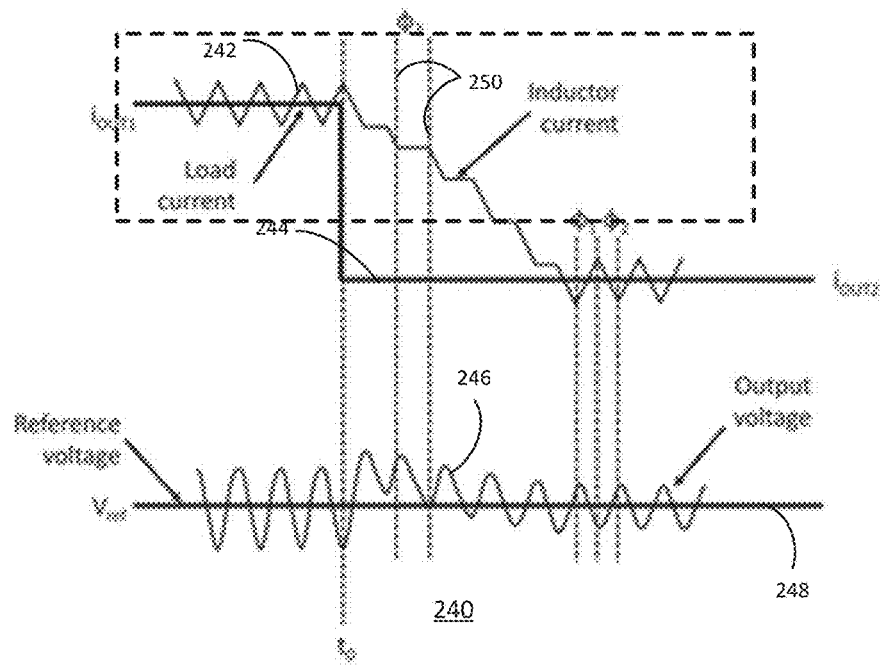
FIG. 6 shows an example response using the predictive controller of FIG. 4 when a load step from a first load current to a second lower load current occurs.

FIG. 6 shows an example response 240 using the predictive controller 200 over time when a load step from a first load current $I_{out1}$ to a second lower load current $I_{out2}$ occurs at a time $t_0$. The response 240 shows the load current line 244, the inductor current 242, the reference voltage 248 corresponding to the desired DC output voltage and the actual output voltage 246 ($V_{out}$).

In case of a load step from high to low load a predictive adjustment of the inductor current is not applied, since the average inductor current must remain at the load current level until the actual load step occurs. However, switching phase $\phi_3$ can also be used in this case to avoid voltage overshoots.

In this case, during the ramp down following time $t_0$, phase $\phi_1$ is omitted and the stored energy is released to the load in a controlled way by successively adding $\phi_2$ and $\phi_3$ until current $I_{OUT2}$ is reached. As with ramp up, an optimized sequence of switching phases can be calculated when the load (e.g. a microcontroller) informs the optimizer that the load will step to $I_{OUT2}$ from $I_{OUT1}$ at $t=t_0$, since the final value of the load current following the transition may be predetermined, no calculation of a sequence of target inductor peak currents is required. Instead, the new peak inductor current according to the lower $I_{OUT2}$ can be applied immediately at time $t_0$. As the peak inductor current is higher than the target or reference inductor current value, the DC-DC controller 202 will skip switching phase $\phi_1$ and will apply switching phase $\phi_2$ and $\phi_3$ only until the inductor current is lower than the new target value.

The predictive controller 200 may be used to implement a DC-DC converter with lower switching frequency and hence higher efficiency especially at low load that can achieve a similar dynamic response to a DC-DC converter at high switching frequency. The size of the output capacitor $C_{buf}$ can be reduced since output voltage undershoots and overshoots are more under control. Furthermore, the use of a larger inductor is possible to reduce the output voltage ripple while maintaining the same dynamic response.

Predictive Controller 200 generates an additional phase $\phi_3$ which allows the inductor to be shorted to maintain a constant inductor current. In other example, predictive controllers, the additional phase may not be required. This may be the case for example when a relatively low inductance is used because the additional energy stored in the inductance per cycle is relatively low. A low inductance value is in the order of a few nanoHenries. Typical inductor values are in the order of a few microHenries. The predictive controller 200 operates in a CCM mode. However, in other examples, the predictive controller may operate in a discontinuous-conduction mode (DCM).

Figure 7:
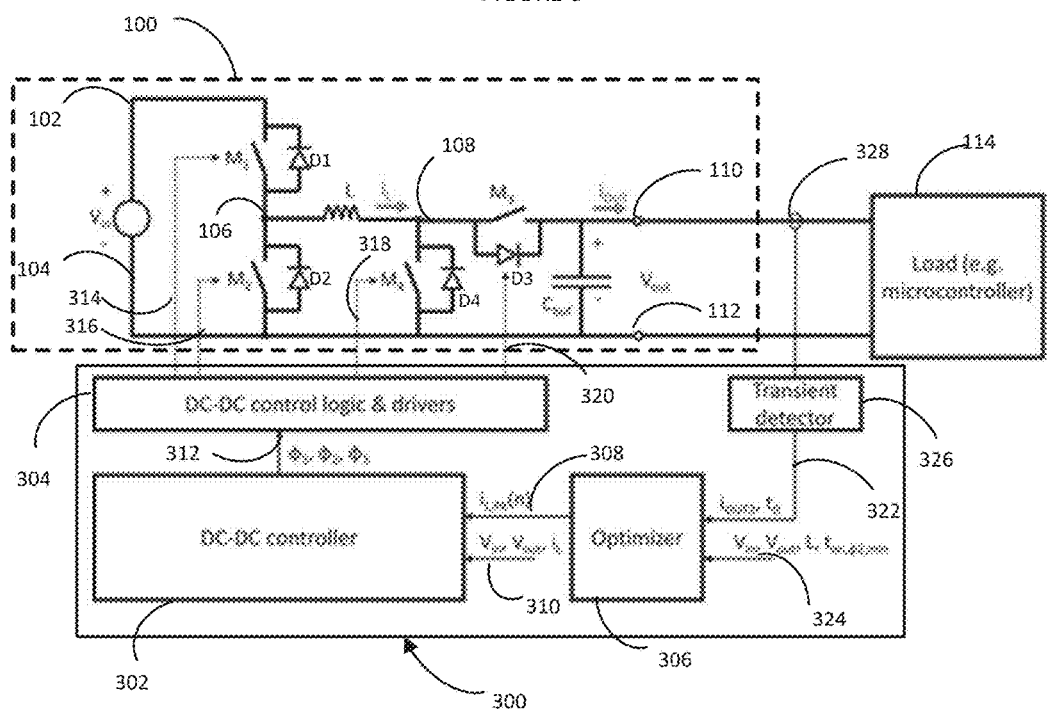
FIG. 7 shows a predictive controller for an inductive buck-boost DC-DC converter according to an embodiment.

FIG. 7 shows a predictive controller 300 for an inductive DC-DC converter according to an embodiment. The predictive controller 300 includes a DC-DC controller 302 for generating switching phases, DC-DC control logic and drivers 304, an optimizer 306 and a transient detector 326. The optimizer 306 may have a load parameter input 322 connected to an output of the transient detector 326. The optimizer 306 may have a control parameter input 324. The optimizer 306 may have a target inductor current output 308 connected to the DC-DC controller 302. The DC-DC controller 302 may have a DC-DC control parameter input 310. The DC-DC controller 302 may have a switching phase output 312 connected to the DC-DC control logic and drivers 304. It will be appreciated that the switching phase output 312 may include multiple wires. The DC-DC control logic and drivers 304 may have driver outputs 314, 316, 318, 320 for controlling a respective switch of a DC-DC converter.

In operation, the predictive controller 300 may be connected to a buck-boost converter switch circuit 100. The transient detector 326 may have an input connected to an output current sensor 328. A first driver output 314 may be connected to control input of switch M1. A second driver output 316 may be connected to control input of switch M2. A third driver output 320 may be connected to control input of switch M3. A fourth driver output 318 may be connected to control input of switch M4. Switches M1 to M4 may be implemented as MOS transistors and the control inputs may be the gate terminals of the respective transistors.

A load 114 which may for example be a microcontroller may be connected to the output terminals 110,112 of the DC-DC buck-boost converter 100. An inductor current sensor (not shown) may be connected to the parameter input 310 of the DC-DC controller 302. An input voltage detector (not shown) for detecting the voltage across the input terminals 102, 104 may be connected to the parameter input 310 of the DC-DC controller 302. An output voltage detector (not shown) for detecting the voltage across the output terminals 110, 112 may be connected to the parameter input 310 of the DC-DC controller 302. An input voltage detector (not shown) may be connected to the parameter input 324 of the optimizer 306. An output voltage detector (not shown) may be connected to the parameter input 324 of the optimizer 306. The optimizer 306 may also receive a predetermined value of the inductance L and the minimum on time of the second switching phase ($t_{on,\phi2,min}$) on the parameter input 324.

In operation the DC-DC controller 302 may generate three non-overlapping switching phases to control switches M1 to M4 as previously indicated in Table 2. The transient detector 326 may determine a load profile by monitoring the load current and storing the times at which major load steps occur. This predetermined profile may then be used to predict when low-to-high and high-to-low load current steps are expected. In other examples, dependent on the type of load, the load voltage may be monitored instead of or in addition to the load current. For example, if the load is resistive either load current or load voltage may be monitored. In other examples, the predetermined profile may be used to predict low-to-high and high-to-low load voltage steps.

For a low-to-high load step, the optimizer 306 may calculate an optimum ramp time $t_{ramp}$ based on $V_{in}$, $V_{out}$, L and $t_{on,\phi2,min}$ and translate this into a sequence of target inductor peak currents $i_{L,PK}(n)$ where n is the number of the consecutive switching period. These target inductor peak currents may be sent to the DC-DC controller 302 starting before the actual load step occurs.

The DC-DC controller 302 may operate in peak-current-mode control to adjust switching phase $\phi_1$ such that the target peak inductor current $i_{L,PK}(n)$ is reached in each switching period n. The switching phase $\phi_2$ may be adjusted such that the output voltage is maintained during the inductor current ramp period $t_{ramp}$.

During the ramp, switching phase $\phi_3$ may be either zero, in case of a variable switching frequency control, or eventually non-zero, in case of fixed-switching-frequency control.

The switching phase information $\phi_1$, $\phi_2$ and $\phi_3$ is provided by the DC-DC controller to the control logic and gate drivers which turn-on and turn-off the switches $M_1$ to $M_4$ accordingly.

Once the new target value of inductor current has been reached, the inductor current may be maintained substantially constant using switching phases $\phi_1$, $\phi_2$ and $\phi_3$ When the load step eventually occurs at time $t_0$, the predictive controller 300 may then maintain the average inductor current value in line with the new load current using switching phases $\phi_1$, $\phi_2$.

By ramping the inductor current prior to the load step, the output voltage overshoot and/or undershoot may be reduced.

In case of a load step from high to low load a predictive adjustment of the inductor current is not applied, since the average inductor current must remain at the load current level until the actual load step occurs.

In this case, during the ramp down following time $t_0$, phase $\phi_1$ is omitted and the stored energy is released to the load in a controlled way by successively adding $\phi_2$ and $\phi_3$ until the target current is reached. As with ramp up, an optimized sequence of switching phases can be calculated when the transient detector 326 informs the optimizer 306 that the load will step down. Since the final value of the load current following the transition may be predetermined, no calculation of a sequence of target inductor peak currents is required. Instead, the new peak inductor current according to the lower load current can be applied immediately at time $t_0$. As the peak inductor current is higher than the target, the DC-DC controller 202 may skip switching phase $\phi_1$ and apply switching phase $\phi_2$ and $\phi_3$ only until the inductor current is lower than the new target value.

The predictive controller 300 may be used to implement a DC-DC converter with lower switching frequency and hence higher efficiency especially at low load which can achieve a similar dynamic response to a DC-DC converter at high switching frequency. The size of the output capacitor $C_{buf}$ can be reduced since output voltage undershoots and overshoots are more under control. Furthermore, the use of a larger inductor is possible to reduce the output voltage ripple while maintaining the same dynamic response.

In other embodiments, instead of short-circuiting the inductor L and free-wheeling the inductor current in switching phase $\phi_3$, it is possible to use the transistor $M_4$ during switching phase $\phi_2$ to shunt the excessive energy stored in the inductor L. In this case switching phase $\phi_3$ may not be required. The excess energy stored in the inductor L may be dissipated in transistor $M_4$ in each switching period.

Figure 8:
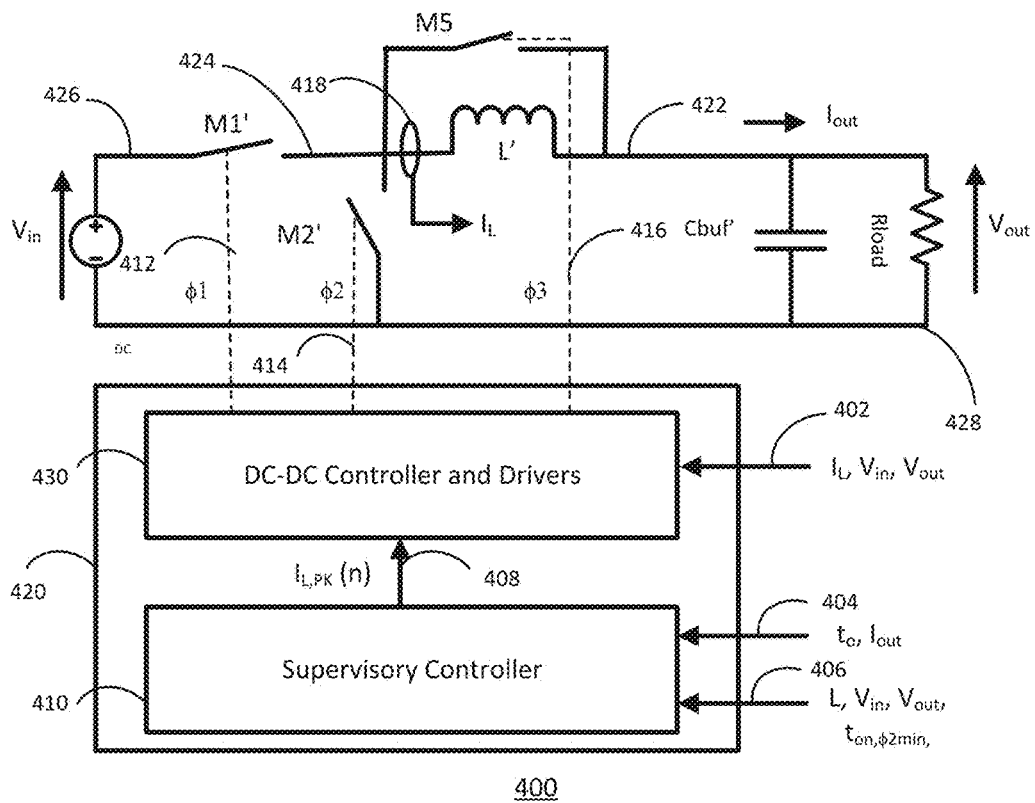
FIG. 8 shows a predictive controller for an inductive buck DC-DC converter according to an embodiment.

FIG. 8 shows a DC-DC inductive buck converter 400 including a predictive controller 420.

The buck converter 400 includes switches M1', M2' and M5 which are typically implemented as MOS transistors with a respective body diode (not shown), and an inductor L'. The arrangement of switches M1', M2' and M5 and the inductor L' may be considered as a switchable inductance. A series arrangement of switches M1 and M2 is connected between a DC input supply terminal 426 and a ground rail 428. The inductor L' may be connected between the common node 424 between switches M1 and M2 and the voltage output 422. The switch M5 is connected between the terminals of the inductor L'. A capacitor Cbuf is connected between the voltage output 422 and the ground rail 428.

The predictive controller 420 may include a supervisory controller 410 and a DC-DC controller 430. The DC-DC controller 430 typically includes drivers for controlling the switches M1', M2' and M5. The DC-DC controller 430 may have an input 402 connected to an inductor current sensor 418, the input voltage rail 426 and the voltage output 422. The supervisory controller 410 may have a first input 404 connected to an output current sensor (not shown) and a second input 406 for receiving operating parameters such as desired input and output voltage, inductance value and minimum on time for second clock phase ($t_{on,\phi2,min}$). The supervisory controller 410 may have an output 408 connected to the DC-DC controller 430. The DC-DC controller 430 may have a first output 412 connected to switch M1', a second output 414 connected to switch M2' and a third output 416 connected to switch M5. The DC-DC controller 430 generates 3 switching phases to control the switches according to table 3.

TABLE 3

| Mode of operation | M1' | M2' | M5 | Voltage conversion ratio |
|---|---|---|---|---|
| buck mode | $\phi_1$ | $\phi_2$ | $\phi_3$ | M(D) = D |

In operation the DC-DC controller 430 may generate three non-overlapping switching phases to control switches M1', M2', M5 as shown in Table 3. The supervisory controller 410 may determine a load profile by monitoring the load current and storing the times at which major load steps occur. This predetermined profile may then be used to predict low-to-high and high-to-low load current steps. The duty cycle D is determined as for table 1.

For a low-to-high load step of a load represented by $R_{load}$ connected between the voltage output 422 and the ground rail 428, the supervisory controller 410 may calculate an optimum ramp time $t_{ramp}$ based on $V_{in}$, $V_{out}$, L and $t_{on,\phi2,min}$ and translate this into a sequence of target inductor peak currents $i_{L,PK}(n)$ where n is the number of the consecutive switching period. These target inductor peak currents may be sent to the DC-DC controller 430 starting before the actual load step occurs.

The DC-DC controller 430 may operate in peak-current-mode control to adjust switching phase $\phi_1$ such that the target peak inductor current $i_{L,PK}(n)$ is reached in each switching period n. The switching phase $\phi_2$ may be adjusted such that the output voltage is maintained during the inductor current ramp period $t_{ramp}$.

During the ramp, switching phase $\phi_3$ may be either zero, in case of a variable switching frequency control, or eventually non-zero, in case of fixed-switching-frequency control.

The switching phase information $\phi_1$, $\phi_2$ and $\phi_3$ is provided by the DC-DC controller to the control logic and gate drivers which turn-on and turn-off the switches M'$_1$, M'$_2$ and M$_5$ accordingly.

Once the new target value of inductor current has been reached, the inductor current may be maintained substantially constant using switching phases $\phi_1$, $\phi_2$ and $\phi_3$ When the load step eventually occurs at time $t_0$, the predictive controller 420 may then maintain the average inductor current value in line with the new load current using switching phases $\phi_1$, $\phi_2$.

By ramping the inductor current prior to the load step, the output voltage undershoot and overshoot may be reduced.

In case of a load step from high to low load a predictive adjustment of the inductor current is not applied, since the average inductor current must remain at the load current level until the actual load step occurs.

In this case, during the ramp down following time $t_0$, phase $\phi_1$ is omitted and the stored energy is released to the load in a controlled way by successively adding $\phi_2$ and $\phi_3$ until the target current is reached. As with ramp up, an optimized sequence of switching phases can be calculated when the supervisory controller 410 determines that the load will step down from the predetermined load profile. Since the final value of the load current following the transition may be predetermined, no calculation of a sequence of target inductor peak currents is required. Instead, the new peak inductor current according to the lower load current can be applied immediately at time $t_0$. As the peak inductor current is higher than the target, the DC-DC controller 430 may skip switching phase $\phi_1$ and apply switching phase $\phi_2$ and $\phi_3$ only until the inductor current is lower than the new target value.

The buck converter 400 including the predictive controller 420 with a lower switching frequency and hence higher efficiency especially at low load may achieve a similar dynamic response to a DC-DC converter at high switching frequency. The size of the output capacitor $C_{buf}$ can be reduced since output voltage undershoots and overshoots are more under control. Furthermore, the use of a larger inductor is possible to reduce the output voltage ripple while maintaining the same dynamic response.

Figure 9:
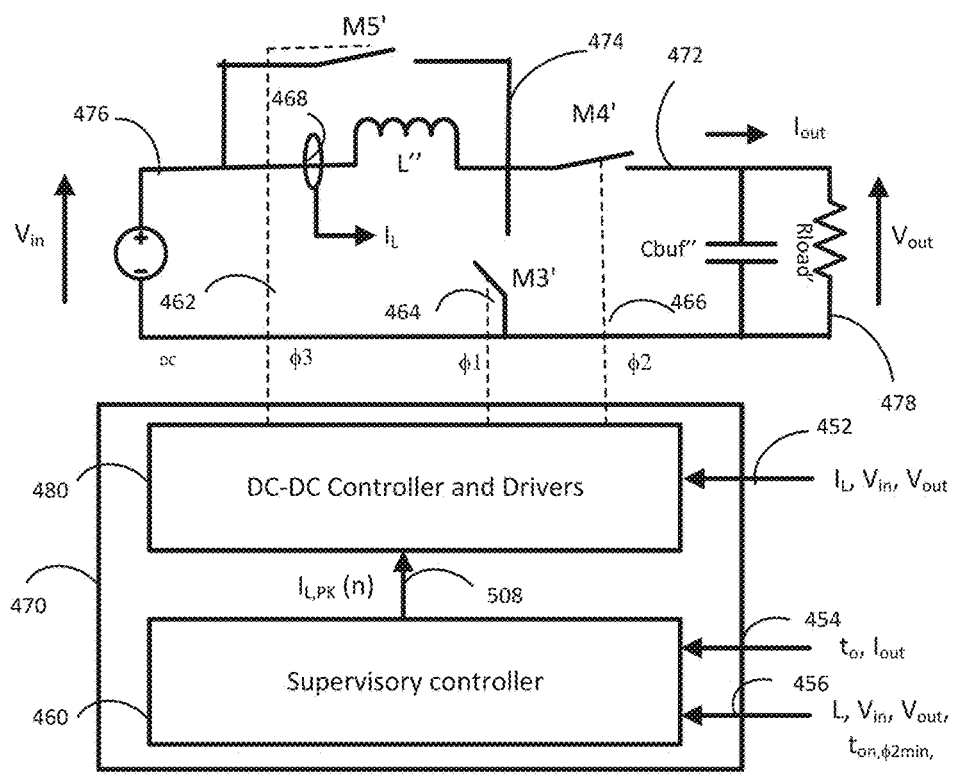
FIG. 9 shows a predictive controller for an inductive boost DC-DC converter according to an embodiment.

FIG. 9 shows a DC-DC inductive boost converter 450 including a predictive controller 470.

The boost converter 450 includes switches M3', M4' and M5' which are typically implemented as MOS transistors with a respective body diode (not shown), and an inductor L". The arrangement of switches M3', M4', M5' and the inductor L" may be considered as a switchable inductance. A series arrangement of switches M3' and M4' is connected between the voltage output 472 and a ground rail 478. The inductor L" may be connected between the common node 474 between switches M3' and M4' and the supply voltage input 476. The switch M5' is connected between the terminals of the inductor L". A capacitor Cbuf" is connected between the voltage output 472 and the ground rail 478.

The predictive controller 470 may include a supervisory controller 460 and a DC-DC controller 480. The DC-DC controller 480 typically includes drivers for controlling the switches M3', M4' and M5'. The DC-DC controller 480 may have an input 452 connected to an inductor current sensor 468, the input voltage rail 476 and the voltage output 472. The supervisory controller 460 may have a first input 454 connected to an output current sensor (not shown) and a second input 456 for receiving operating parameters such as desired input and output voltage, inductance value and minimum on time for second clock phase ($t_{on,\phi2,min}$). The supervisory controller 460 may have an output 458 connected to the DC-DC controller 480. The DC-DC controller 480 may have a first output 466 connected to switch M4', a second output 464 connected to switch M3' and a third output 462 connected to switch M5'. The DC-DC controller 480 may generate three switching phases to control the switches according to table 4.

TABLE 4

| Mode of operation | M3' | M4' | M5' | Voltage conversion ratio |
|---|---|---|---|---|
| boost mode | $\phi_1$ | $\phi_2$ | $\phi_3$ | $M(D) = \dfrac{1}{1-D}$ |

In operation the DC-DC controller 530 may generate three non-overlapping switching phases to control switches M1', M2', M5' as shown in Table 3. The supervisory controller 510 may determine a load profile by monitoring the load current and storing the times at which major load steps occur. This predetermined profile may then be used to predict low-to-high and high-to-low load current steps. The duty cycle D is determined as for table 1.

For a low-to-high load step, the supervisory controller 510 may calculate an optimum ramp time $t_{ramp}$ based on $V_{in}$, $V_{out}$, L and $t_{on,\phi2,min}$ and translate this into a sequence of target inductor peak currents $i_{L,PK}(n)$ where n is the number of the consecutive switching period. These target inductor peak currents may be sent to the DC-DC controller 530 starting before the actual load step occurs.

The DC-DC controller 530 may operate in peak-current-mode control to adjust switching phase $\phi_1$ such that the target peak inductor current $i_{L,PK}(n)$ is reached in each switching period n. The switching phase $\phi_2$ may be adjusted such that the output voltage is maintained during the inductor current ramp period $t_{ramp}$.

During the ramp, switching phase $\phi_3$ may be either zero, in case of a variable switching frequency control, or eventually non-zero, in case of fixed-switching-frequency control.

The switching phase information $\phi_1$, $\phi_2$ and $\phi_3$ provided by the DC-DC controller 530 turn-on and turn-off the switches M3', M4' and M5' accordingly.

Once the new target value of inductor current has been reached, the inductor current may be maintained substantially constant using switching phases $\phi_1$, $\phi_2$ and $\phi_3$ When the load step eventually occurs at time $t_0$, the predictive controller 520 may then maintain the average inductor current value in line with the new load current using switching phases $\phi_1$, $\phi_2$.

By ramping the inductor current prior to the load step, the output voltage overshoot may be reduced.

In case of a load step from high to low load a predictive adjustment of the inductor current is not applied, since the average inductor current must remain at the load current level until the actual load step occurs.

In this case, during the ramp down following time $t_0$, phase $\phi_1$ is omitted and the stored energy is released to the load in a controlled way by successively adding $\phi_2$ and $\phi_3$ until the target current is reached. As with ramp up, an optimized sequence of switching phases can be calculated when the supervisory controller 510 determines that the load will step down from the predetermined load profile. Since the final value of the load current following the transition may be predetermined, no calculation of a sequence of target inductor peak currents is required. Instead, the new peak inductor current according to the lower load current can be applied immediately at time $t_0$. As the peak inductor current is higher than the target, the DC-DC controller 530 may skip switching phase $\phi_1$ and apply switching phase $\phi_2$ and $\phi_3$ only until the inductor current is lower than the new target value.

The boost converter 500 including the predictive controller 520 with a lower switching frequency and hence higher efficiency especially at low load may achieve a similar dynamic response to a DC-DC converter at high switching frequency. The size of the output capacitor $C_{buf}$" can be reduced since output voltage undershoots and overshoots are more under control. Furthermore, the use of a larger inductor is possible to reduce the output voltage ripple while maintaining the same dynamic response.

Figure 10A:
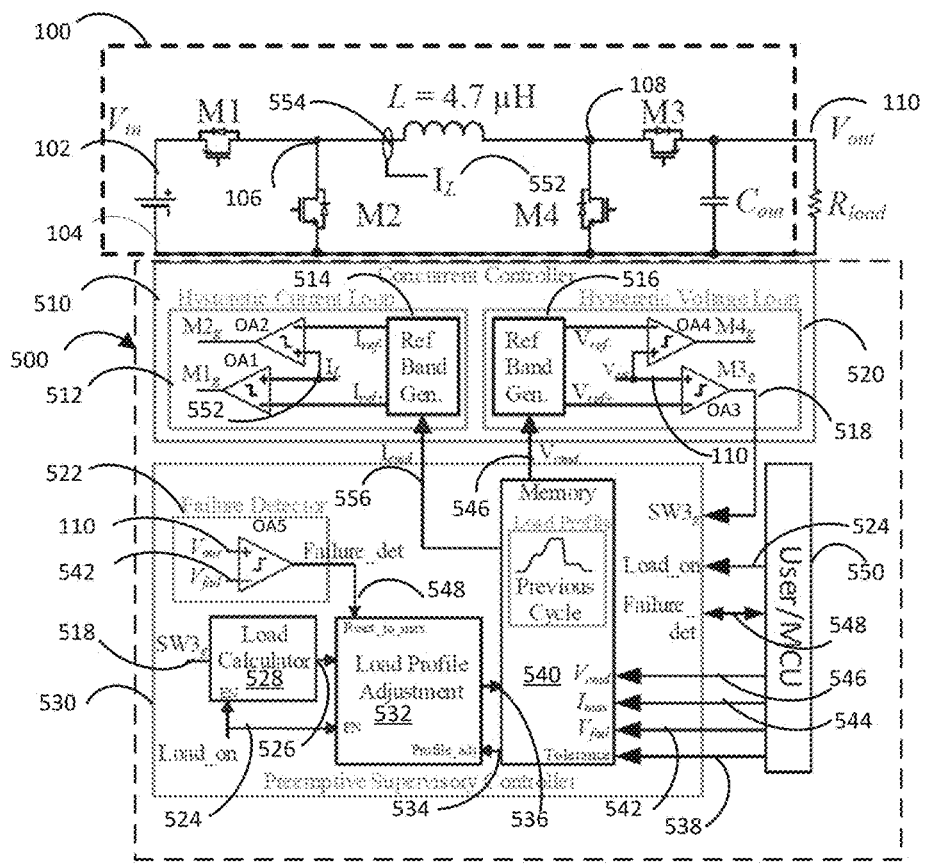
FIG. 10a shows an inductive buck-boost DC-DC converter using a predictive concurrent controller with four switching phases according to an embodiment.

FIG. 10A shows a predictive or pre-emptive concurrent controller 500 for an inductive DC-DC buck-boost converter. The pre-emptive concurrent controller 500 includes a concurrent controller 510 and a pre-emptive supervisory controller 530. The concurrent controller 510 includes a hysteretic current loop 512 and a hysteretic voltage loop 520.

The hysteretic current loop 512 may include a current reference band generator 514 having a first reference output providing an upper reference current level $I_{ref+}$ connected to an inverting input of a comparator OA1 and a second reference output providing a lower reference current level $I_{ref-}$ connected to an inverting input of a comparator OA2. The non-inverting inputs of comparators OA1 and OA2 may be connected 552 to an inductor current sensor 554 for determining an inductor current in a buck-boost converter circuit 100. The current reference band generator 514 may have an input 556 which determines a desired current value $I_{cmd}$. The output of comparator OA1 may drive the switch M1 of buck-boost converter circuit 100. The output OA2 may drive the switch M2 of buck-boost converter circuit 100. In other examples, instead of a defined upper and lower reference current level, a single current value may be used.

The hysteretic voltage loop 520 may include a voltage reference band generator 516 having a first reference output providing an upper reference voltage $V_{ref+}$ connected to an inverting input of a comparator OA3 and a second reference output providing a lower reference voltage $V_{ref-}$ connected to an inverting input of a comparator OA4. The non-inverting inputs of comparators OA3 and OA4 may be connected together and connected to the output 110 of a buck-boost converter circuit 100. The voltage reference band generator 516 may have an input 554 which determines desired voltage value $V_{cmd}$. The output of comparator OA3 may drive the switch M3 of buck-boost converter circuit 100. The output OA4 may drive the switch M4 of buck-boost converter circuit 100. In other examples, instead of a defined upper and lower reference voltage level, a single value may be used The pre-emptive supervisory controller 530 includes a failure detector 522, a load calculator 528, a load profile adjuster 532, and a load profiler 540.

The failure detector 522 may include a comparator OA5 having a failure voltage input 542 connected to an inverting input and the output voltage 110 connected to the non-inverting input. The failure detector output 558 may be connected to the load profile adjuster 532.

The load calculator 528 may have an input 518 connected to the output of comparator OA3. The load calculator 528 may have an output 526 connected the load profile adjuster 532. The pre-emptive supervisory controller 530 may have a load enable input 524 connected to the load calculator 528 and the load profile adjuster 532. The load profile adjuster 532 may have an output 536 connected to the load profiler 540. The load profile adjuster 532 may have profile adjuster request input 534 connected to the load profiler 540.

The load profiler 540 may be connected to the current command $I_{cmd}$ input 556 and the voltage command $V_{cmd}$ input 546. A user or MCU interface 550 may provide inputs for load enable 524, required voltage $V_{cmd}$ 546, maximum load current $I_{max}$ 544, fail voltage level $V_{fail}$ 542 and a tolerance value 538.

In operation the concurrent controller 510 may allow the simultaneous and independent operation of two hysteretic control loops. The current loop 512 using the input-side half-bridge, M1 and M2 of the DC-DC converter circuit 100, and a voltage loop 520 using the output-side half-bridge, M3 and M4 of the DC-DC converter circuit 100. This is in contrast to a traditional nested architecture, where the voltage loop provides a reference for the current loop. In this case the inductor current reference value, $I_{cmd}$, is generated on the current reference output 556 of the load profiler 540 of the pre-emptive module 530, which includes a calibrated load forecast of a load $R_{load}$ stored in memory in the load profiler 540. The four-switch topology of buck-boot converter circuit 100 has a freewheeling mode whereby the inductor L is shorted when M2 and M4 are on. This allows the voltage loop 520 to regulate $V_{out}$ even if $I_{cmd} > I_{load}$ (the load current). The freewheeling mode may allow the inductor current $I_L(t)$ to be ramped up prior to the load step without causing an over-voltage event on $V_{out}$, and thus it allows a reduction in $C_{out}$ which may be below the theoretical minimum value of $C_{out}$ possible for TOC control schemes as predicted from equation (2) to achieve a particular voltage undershoot and/or overshoot.

Figures 10B, 10C:
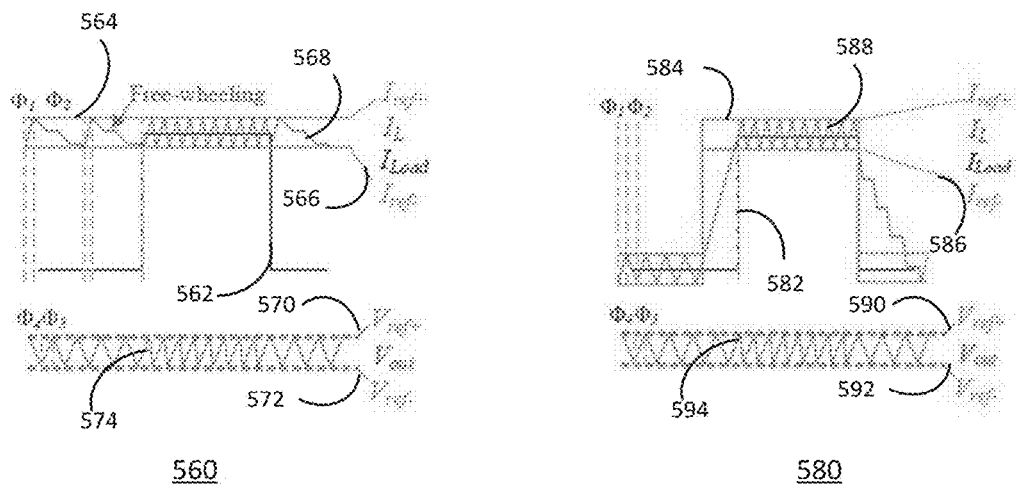
FIG. 10b shows the behaviour of inductive buck-boost DC-DC converter of FIG. 10a before load calibration.
FIG. 10c shows the behaviour of inductive buck-boost DC-DC converter of FIG. 10a after load calibration.

The operation of the pre-emptive concurrent controller 500 prior to calibration is shown in the waveform diagram 560 in FIG. 10b. The waveform diagram 560 shows load current $I_{load}$ 562, the upper current reference $I_{ref+}$ 564, the lower current reference $I_{ref-}$ 566, the inductor current IL 568, the upper reference voltage $V_{ref+}$ 570, the lower reference voltage $V_{ref-}$ 572 and the output voltage $V_{out}$ 574. The current loop 512 generates first and second switch phases $\phi_1$, $\phi_2$ which may maintain the inductor current 568 in a reference band or window between $I_{ref+}$ and $I_{ref-}$. The voltage loop 520 generates third and fourth switch phases $\phi_3$, $\phi_4$ which may maintain the output voltage 574 in a reference band or window between $V_{ref+}$ and $V_{ref-}$. In this case the current command value $I_{cmd}$ is constant and regular freewheeling is needed to maintain voltage regulation prior to load steps.

The ideal post-calibration waveform 580 is shown in FIG. 10c. The waveform diagram 580 shows load current $I_{load}$ 582, the upper current reference $I_{ref+}$ 584, the lower current reference $L_{ref-}$ 586, the inductor current $I_L$ 588, the upper reference voltage $V_{ref+}$ 590, the lower reference voltage $V_{ref+}$ 592 and the output voltage $V_{out}$ 594. The current loop 512 generates first and second switch phases $\phi_1$, $\phi_2$. The voltage loop 520 generates third and fourth switch phases $\phi_3$, $\phi_4$. In FIG. 10b inductor current $I_L(t)$ already is at its high level before and after the load step. In the regions where the load current is low freewheeling is needed to ensure that the output voltage does not show any overshoots. In FIG. 10c $I_L(t)$ is pre-emptively regulated to reach $I_{load}$ prior to the step. In this case, total freewheeling time is minimized and thus efficiency is maximized. The PCC switching frequency is variable, but the switching frequency $f_s$ can also be regulated using a Phase-Locked-Loop.

Figure 10D:
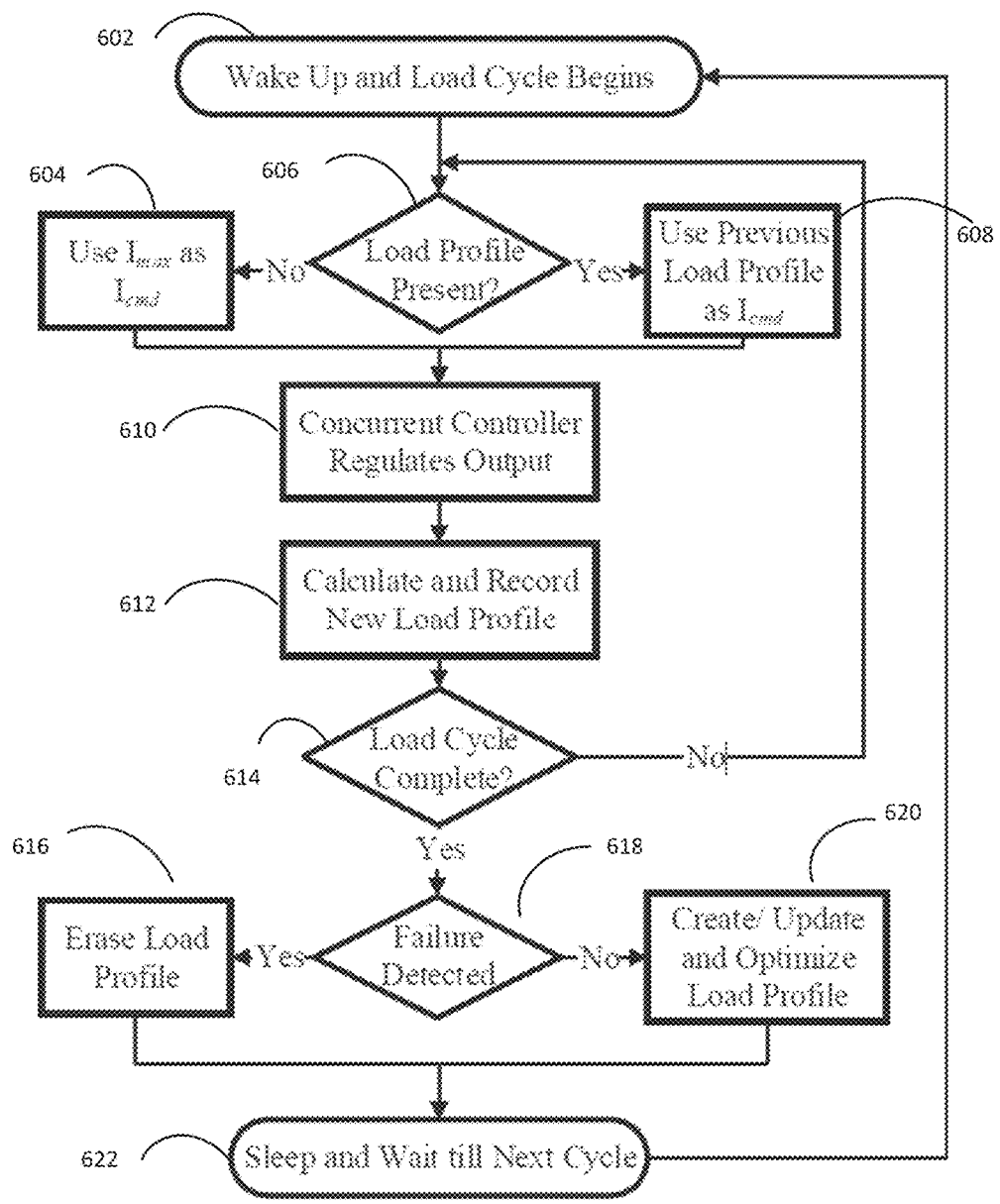
FIG. 10d shows a flow diagram of a potential load calibration scheme.

The method of calibration 600 of the pre-emptive concurrent controller 500 is shown in FIG. 10d. By examining the time that M3 is switched on ($t_{M3,on}$) and the average inductor current ($I_{L,avg}$) over the time period of the control signal for M3, $t_{M3,period}$, load current ($I_{load}$) during the period can be approximated as follows:

$$I_{load} = I_{L,avg} \frac{t_{M3,on}}{t_{M3,period}} \tag{3}$$

Using the approximated load profile obtained from equation 3, the pre-emptive controller 500 may calibrate its predictions each load-step cycle.

The predictive controller may be used in particular with systems having the following characteristics: 1) the maximum possible load current $I_{max}$ is known. The maximum possible load current value may be used as a predetermined load profile prior to further calibration; 2) the load profile is repetitive (within a defined tolerance to account for data dependency and timing jitter); and 3) the system is tolerant of single-cycle communication failure at start-up due to the risk of under-voltage. Systems that meet these conditions include many Internet-of-Things Wireless Sensor Network (IoT-WSN) applications.

The calibration method 600 operates as follows. In step 602 the system wakes-up and the load cycle begins at step 602. In step 606 a check is made to see whether a load profile already exists in the memory of the load profiler 540. If the load profile already exists then the required value of inductor current $I_{cmd}$ is output to the current reference band generator input 556. If the load profile is not present then the method proceeds to step 604 and the value of $I_{max}$ is used as the required value of inductor current $I_{cmd}$. Following the determination of $I_{cmd}$ in either of steps 604 or 608, the concurrent controller 510 regulates the output in step 610. In step 612 the load calculator 528 may calculate and record a new load profile. In step 614 a check is made to determine whether or not the load cycle is complete. If the load cycle is not complete, the method returns to step 606. If the load cycle is complete, then in step 618, a check is made by the failure detector 522 to determine whether the output voltage $V_{out}$ is greater than the failure voltage level $V_{fail}$. If a failure is detected then the load profile may be erased in step 616. If a failure is not detected, then in step 620 a load profile may be created/or updated by the load profile adjuster 532 which may then update the load profile in the load profiler 540. Following completion of either step 616 or 620, the method proceeds to step 622 in which the system may return to a sleep mode and wait until the next load cycle at which point the method restarts at step 602.

Figure 11A:
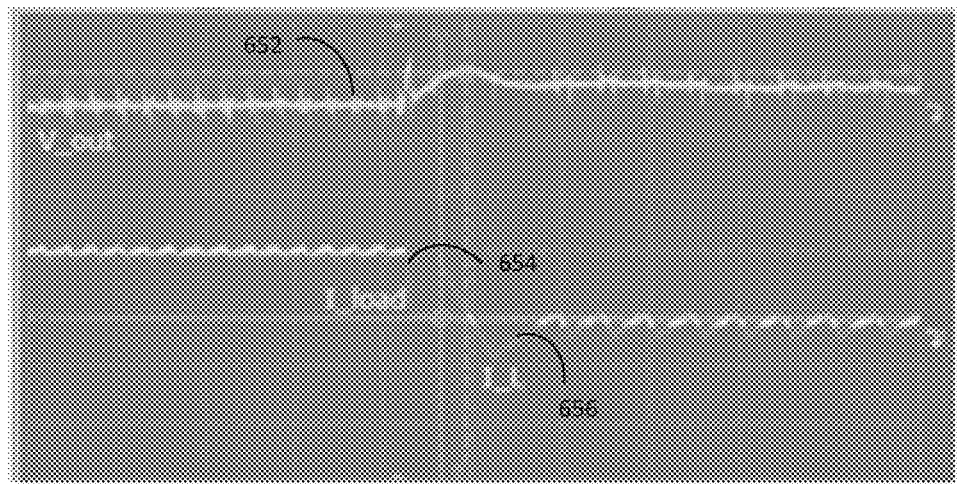
FIG. 11a shows the measured response of an inductive buck-boost DC-DC converter to a high-to-low load current step using a time-optimized control scheme as depicted in FIG. 3.
Figure 11B:
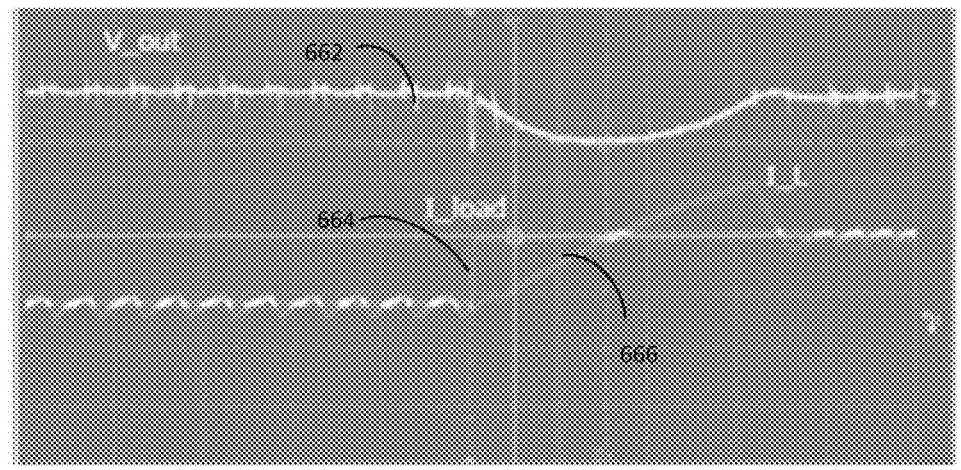
FIG. 11b shows the measured response of an inductive buck-boost DC-DC converter to a low-to-high load current step using a time-optimized control scheme as depicted in FIG. 3.
Figure 11C:
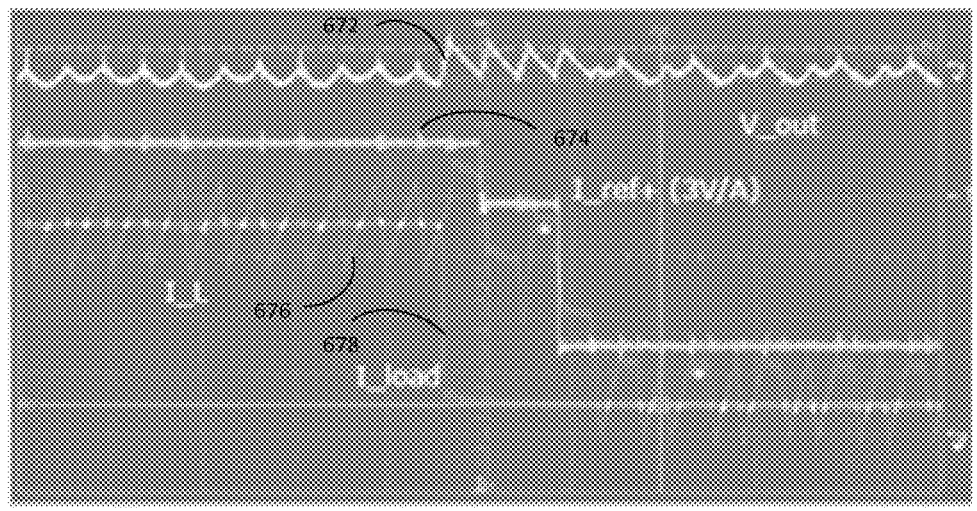
Figure 11D:
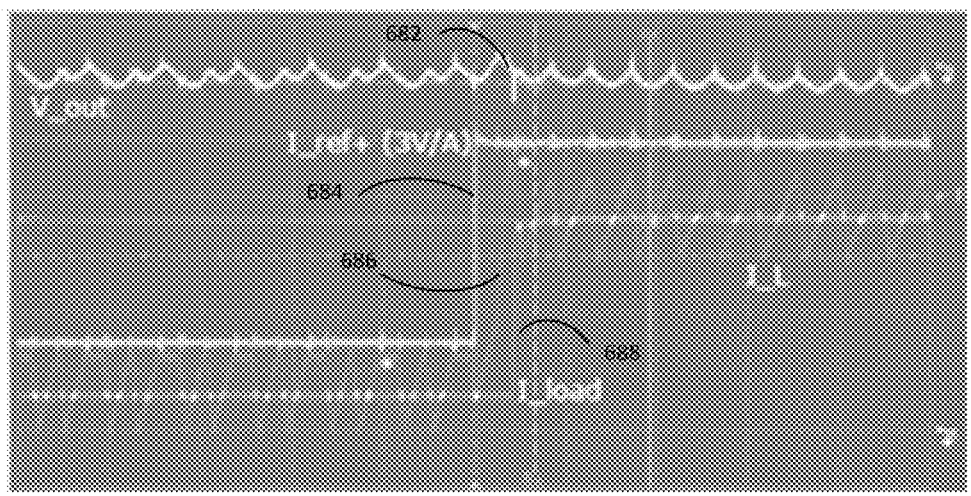

Example results of a conventional time-optimal controller are shown in FIGS. 11*a* and 11*b*. Example results of the controller 500 are shown in FIGS. 11*c* and 11*d*.

The results are based on a target switching frequency of $f_s=1$ MHz and the voltage specifications of the ZigBee wireless transceiver, which has a nominal VDD of 3.3 V and a permissible transient excursion of 3-3.6 V.

The baseline response of a conventional controller to high-to-low and low-to-high load steps is shown in FIGS. 11*a* and 11*b*, respectively. FIG. 11*a* shows a response 650 to a high-to-low step of load current 654. The inductor current is shown in line 656 and the output voltage is shown in line 652.

FIG. 11*b* shows a response 660 to a low-to-high step of load current 664. The inductor current is shown in line 666 and the output voltage is shown in line 662.

The PCC response under the same conditions is shown in FIGS. 11*c*, and 11*d*. FIG. 11*c* shows a response 670 to a high-to-low step of load current 678. The inductor current is shown in line 676 and the output voltage is shown in line 672. Line 674 shows the upper reference current $I_{ref+}$.

FIG. 11*d* shows a response 680 to a low-to-high step of load current 688. The inductor current is shown in line 686 and the output voltage is shown in line 682. Line 684 shows the upper reference current $I_{ref+}$.

The pre-emptive concurrent controller (PCC) 500 has a ten times smaller capacitor and achieves a 120 mV regulation band around 3.3 V while conventional time optimal control (TOC) achieves 150 mV. The pre-emptive concurrent controller 500 may achieve similar voltage overshoot/undershoot performance as a conventional controller with a significantly lower capacitance.

The results demonstrate that the PCC implemented with dual concurrent hysteric loops can achieve an order of magnitude reduction in capacitor size over time-optimal control, without sacrificing voltage regulation or efficiency. In applications where the variable frequency operation of the PCC is undesirable, a fixed-frequency mode can be introduced following the load steps, once the system is calibrated.

Figure 12A:
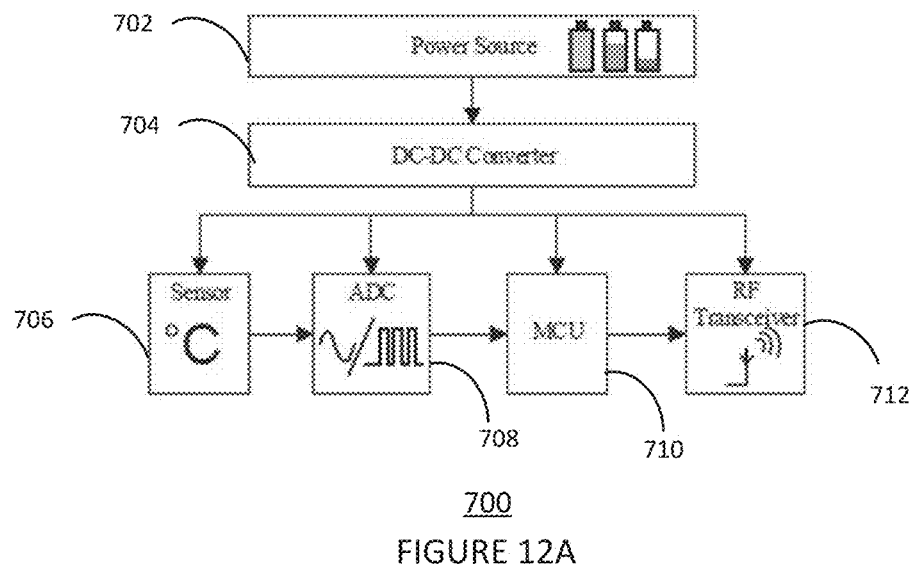
FIG. 12a shows a wireless sensor including a DC-DC converter according to an embodiment.

FIG. 12A shows a portable wireless sensor system 700 including a DC-DC converter according to an embodiment. The system 700 includes a power source 702 which may typically be a battery. The power source 702 may be connected to a DC-DC converter 704. The DC-DC converter 704 may use any of the embodiments of the DC-DC controllers described herein. The portable wireless sensor system 700 may include a sensor 706, for example a temperature sensor connected to an analog-to-digital converter 708. The output of the analog-to-digital converter 708 may be connected to a microcontroller 710. The MCU 710 may be connected to RF transceiver 712. The sensor 706, the ADC 708 the MCU 710 and the RF transceiver 712 may form the load of the DC-DC converter 704.

Figure 12B:
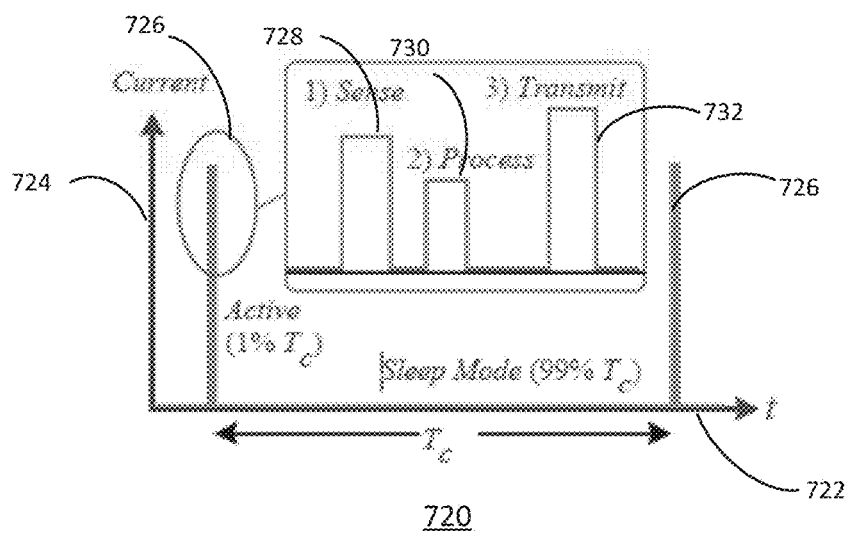

FIG. 12B shows the variation of load current 720 of the portable wireless sensor system 700 showing the variation of current 724 with time 722. Wireless sensor system 700 may spend well over 90% of the time in sleep mode, and periodically wakes up at time periods 726 during an operational cycle. The IoT cycle, having a total period including wake period 726 and the sleep period of $T_c$, consists of measurement 728, processing 730 and wireless transmission 732 steps carried out during the wake period 726. The load current profile during the full cycle is typically only weakly data-dependent. From the power management perspective, this may translate into a periodic, and more importantly, predictable load current profile. Hence, with a predictable load, the DC-DC power converter can pre-emptively adjust its output to match the dynamic demands of the load, thus significantly reducing the output capacitance requirement.

The DC-DC converter with predictive controller may have a high dynamic performance to meet the supply voltage regulation criteria for CPU's and radios implemented in IoT nodes i.e. avoiding under- and overshoot of the supply voltage at the presence of large load steps. The IoT nodes typically make use of more advanced CMOS technologies where less supply voltage variation is allowed. The DC-DC converter with predictive controller may have low average power consumption especially under partial and low load conditions, which is important for IoT nodes since the available amount of energy is limited as it is typically provided from a battery, a super-capacitor or an energy scavenger.

A control mechanism is described to improve dynamic response in inductive DC-DC converters. In many applications for the internet of things (IoT) like wireless sensor nodes for example using Zigbee or indoor localization nodes the power consumption profiles are repetitive and therefore predictable. This specific circumstance of these applications is exploited by this invention to achieve a better dynamic response, i.e. less voltage drop when load current increases and less voltage overshoot when load current decreases. The predictive controllers may be applied to any inductive DC-DC converter. In some examples, such as when the load is a resistive load, it will be appreciated that the load voltage may be monitored instead of or in addition to the load current.

A predictive controller for an inductive DC-DC converter comprising a switchable inductor is described. The predictive controller includes a DC-DC controller configured to generate a plurality of switching phases to control the inductor current in the switchable inductor, the duration of the switching phases being determined from at least one of a reference inductor current value and a reference output voltage value. The predictive controller includes a supervisory controller coupled to the DC-DC controller and configured to set a reference inductor current value dependent on an expected change in load current and/or voltage of a load configured to be connected to the load terminal. The expected change in load current and/or voltage is determined from a predetermined load profile.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A predictive controller for an inductive DC-DC converter comprising a switchable inductor arranged to be switchably coupled to at least one of a voltage supply input terminal and a load terminal during a switching phase of a switching period, the predictive controller comprising:
   a DC-DC controller configured to generate a plurality of switching phases for controlling the inductor current in the switchable inductor, the duration of the switching phases being determined from at least one of a reference inductor current value and a reference output voltage value, and
   a supervisory controller coupled to the DC-DC controller and configured to set a reference inductor current value dependent on an expected change in load current and/or load voltage of a load configured to be connected to the load terminal, wherein the expected change in load current and/or load voltage is determined from a predetermined load profile.

2. The predictive controller of claim 1 further configured to increase the inductor current reference value before an increase in load current and/or load voltage.

3. The predictive controller of claim 2 wherein the supervisory controller is configured to generate a sequence of increasing reference inductor peak current values before an increase in load current and/or load voltage.

4. The predictive controller of claim 1 further arranged to short-circuit the inductance of the DC-DC controller during at least one switching phase.

5. The predictive controller of claim 1 further configured to decrease the inductor current at a rate determined from the predetermined load profile in response to a decrease in load current and/or load voltage.

6. The predictive controller of claim 1 wherein the supervisory controller is further configured to monitor the load current and/or load voltage and to update the predetermined load profile in response to the monitored load current and/or load voltage.

7. The predictive controller of claim 6 wherein the supervisory controller is further configured to detect a transient in the load current and/or load voltage and to store the transient time and load current and/or load voltage value.

8. The predictive controller of claim 6 wherein the predetermined load profile is determined dependent on the duration of time that the inductance is connected to the load terminal during a switching period.

9. The predictive controller of claim 1 wherein a default predetermined load profile comprises a maximum load current value.

10. The predictive controller of claim 1 wherein the DC-DC controller is configured to generate at least three switching phases.

11. The predictive controller of claim 1, wherein the DC-DC controller comprises a hysteretic current loop and hysteretic voltage loop, wherein the hysteretic current loop is configured to generate a first switching phase and a second switching phase from a comparison of the inductor current and a reference current generated from an expected load current and the hysteretic voltage loop is configured to generate a third switching phase and a fourth switching phase from a comparison between the output voltage and a predetermined output voltage.

12. An inductive DC-DC converter comprising the predictive controller of claim 1, a capacitance coupled between an output voltage terminal and a ground terminal wherein the inductive DC-DC converter is configured to increase the inductor current before an increase in load voltage and/or load current.

13. The DC-DC converter of claim 12 comprising a switchable inductor, the switchable inductor comprising:
   a first series arrangement of a first transistor and a second transistor between the voltage supply input terminal and the ground terminal, a second series arrangement of a third transistor and a fourth transistor between the load terminal and the ground terminal; and an inductance arranged between a common node of the first series arrangement and a common node of the second series arrangement, and
   wherein the DC-DC controller is coupled to the control terminals of the transistors and wherein during at least one switching phase both the second transistor and the fourth transistor are switched on.

14. The DC-DC converter of claim 12 comprising a switchable inductor, the switchable inductor comprising:
   a series arrangement of a first transistor and a second transistor between a voltage supply input terminal and a ground terminal, an inductance arranged between a common node of the first series arrangement and a voltage output terminal and a third transistor arranged in parallel with the inductance, and
   wherein the DC-DC controller is coupled to the control terminals of the transistors and in operation the first transistor is on during a first switching phase, the second transistor is on during a second switching phase, the third transistor is on during a third switching phase wherein the inductance is shorted during the third switching phase.

15. The DC-DC converter of claim 12 comprising a switchable inductor, the switchable inductor comprising:
   a series arrangement of a first transistor and a second transistor between a voltage output terminal and a ground terminal, an inductance arranged between a common node of the series arrangement and a supply voltage input, and a third transistor arranged in parallel with the inductance, and
   wherein the DC-DC controller is coupled to the control terminals of the transistors and in operation the first transistor is on during a first switching phase, the second transistor is on during a second switching phase, the third transistor is on during a third switching phase wherein the inductance is shorted during the third switching phase.

* * * * *